United States Patent
Wu et al.

(10) Patent No.: US 11,617,151 B2
(45) Date of Patent: Mar. 28, 2023

(54) OVERHEAD REDUCTION FOR ZONE IDENTIFIER TRANSMISSION

(71) Applicant: QUALCOMM Incorporated, San Diego, CA (US)

(72) Inventors: Shuanshuan Wu, San Diego, CA (US); Sudhir Kumar Baghel, Hillsborough, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/904,240

(22) Filed: Jun. 17, 2020

(65) Prior Publication Data
US 2021/0068071 A1 Mar. 4, 2021

Related U.S. Application Data

(60) Provisional application No. 62/893,631, filed on Aug. 29, 2019.

(51) Int. Cl.
*H04W 76/11* (2018.01)
*H04W 4/40* (2018.01)
(Continued)

(52) U.S. Cl.
CPC ........... *H04W 64/006* (2013.01); *G01S 19/51* (2013.01); *H04L 1/1819* (2013.01); *H04W 4/40* (2018.02);
(Continued)

(58) Field of Classification Search
CPC ...... H04L 1/1819; H04L 1/1825; H04W 4/40; H04W 4/46; H04W 28/0278; H04W 28/06; H04W 64/006; H04W 76/11
(Continued)

(56) References Cited

U.S. PATENT DOCUMENTS

| 2020/0351981 A1* | 11/2020 | Kang | H04W 4/40 |
| 2021/0029692 A1* | 1/2021 | Hui | H04L 1/1825 |
| 2021/0112375 A1* | 4/2021 | Lee | H04W 4/46 |

OTHER PUBLICATIONS

Interdigital., et al., "Physical Layer Procedures for NR V2X Sidelink", 3GPP TSG RAN WG1 #98, 3GPP Draft, R1-1909032, On Physical Layer Procedures for NR V2X Sidelink_Final, 3rd Generation Partnership Project (3GPP), Mobile Competence Centre, 650, Route Des Lucioles, F-06921 Sophia-Antipolis, vol. RAN WG1, No. Prague, CZ, Aug. 26, 2019-Aug. 30, 2019, Aug. 16, 2019 (Aug. 16, 2019), XP051765636, 12 Pages, Retrieved from the Internet: URL: http://www.3gpp.org/ftp/tsg_ran/WG1_RL1/TSGR1_98/Docs/R1-1909032.zip [retrieved on Aug. 16, 2019] The Whole document.
(Continued)

*Primary Examiner* — Harun Chowdhury
(74) *Attorney, Agent, or Firm* — Muncy, Geissler, Olds & Lowe, P.C./Qualcomm

(57) ABSTRACT

Disclosed are techniques for wireless communication. In an aspect, a transmitter user equipment (UE) determines a first zone identifier (ID) corresponding to a first zone in which the transmitter UE is located, determines a distance threshold based on a distance requirement of an application associated with the transmitter UE, determines a second zone ID based on the first zone ID, the distance threshold, a size of the first zone, or any combination thereof, and transmits the second zone ID and the distance threshold to one or more receiver UEs. In an aspect, the receiver UE receives the second zone ID and the distance threshold, determines a distance between the receiver UE and the transmitter UE based on the second zone ID and a location of the receiver UE, and transmits, based on the distance being less than the distance threshold, a feedback message to the transmitter UE.

13 Claims, 11 Drawing Sheets

(51) Int. Cl.
    H04W 64/00      (2009.01)
    H04W 28/06      (2009.01)
    G01S 19/51      (2010.01)
    H04L 1/1812     (2023.01)
    H04W 92/18      (2009.01)
(52) U.S. Cl.
    CPC ............ H04W 28/06 (2013.01); H04W 76/11 (2018.02); *H04W 92/18* (2013.01)
(58) Field of Classification Search
    USPC ................................ 370/252, 328, 329, 342
    See application file for complete search history.

(56)            References Cited

OTHER PUBLICATIONS

International Search Report and Wrtten Opinion—PCT/US2020/043848—ISA/EPO—dated Oct. 12, 2020.

Sequans Communications: "On HARQ Procedure for NR Sidelink" 3GPP Draft, R1-1908716, 3GPP TSG RAN WG1 Meeting #97, 3rd Generation Partnership Project (3GPP), Mobile Competence Centre, 650, Route Des Lucioles, F-06921 Sophia-Antipolis, Cedex, France, vol. RAN WG1 No. Prague Czechia, Aug. 26, 2019-Aug. 30, 2019, Aug. 17, 2019 (Aug. 17, 2019), XP051765324, 6 Pages, Retrieved from the Internet: URL: http://www.3gpp.org/ftp/tsg_ran/WG1_RL1/TSGR1_98/Docs/R1-1908716.zip [retrieved on Aug. 17, 2019] The Whole Document.

Vivo: "Physical Layer Procedure for NR Sidelink", 3GPP Draft, (Draft) R1-1908154, 3GPP TSG RAN WG1 Meeting #198, Physical Layer Procedure for NR Side Link, 3rd Generation Partnership Project (3GPP), Mobile Competence Centre, 650, Route Des Lucioles, F-06921 Sophia-Antipolis cedex, vol. RAN WG1, No. Prague, CZ, Aug. 26, 2019-Aug. 30, 2019, Aug. 17, 2019 (Aug. 17, 2019), XP051764773, pp. 1-20, Retrieved from the Internet: URL: http://www.3gpp.org/ftp/tsg_ran/WG1_RL1/TSGR1_98/Docs/R1-1908154.zip [retrieved on Aug. 17, 2019] The Whole Document.

* cited by examiner

OVERHEAD REDUCTION FOR ZONE IDENTIFIER TRANSMISSION

CROSS-REFERENCE TO RELATED APPLICATIONS

The present application for patent claims the benefit of U.S. Provisional Application No. 62/893,631, entitled "OVERHEAD REDUCTION FOR ZONE IDENTIFIER TRANSMISSION," filed Aug. 29, 2019, assigned to the assignee hereof, and expressly incorporated herein by reference in its entirety.

BACKGROUND OF THE DISCLOSURE

1. Field of the Disclosure

Various aspects described herein generally relate to wireless communication systems.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the global system for mobile access (GSM) variation of TDMA, etc.

A fifth generation (5G) wireless standard, referred to as New Radio (NR), enables higher data transfer speeds, greater numbers of connections, and better coverage, among other improvements. The NR standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of NR mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An aspect of the disclosure includes a method for wireless communication performed at a transmitter user equipment (UE), including: determining a first zone identifier (ID) corresponding to a first zone in which the transmitter UE is located; determining a distance threshold based on a distance requirement of an application associated with the transmitter UE; determining a second zone ID based on the first zone ID, the distance threshold, a size of the first zone, or any combination thereof; and transmitting the second zone ID and the distance threshold to one or more receiver UEs.

An aspect of the disclosure includes a method for wireless communication performed at a receiver UE, including: receiving, from a transmitter UE, a second zone ID and a distance threshold; determining a location of the receiver UE; determining a distance between the receiver UE and the transmitter UE based on the second zone ID and the location of the receiver UE; based on the distance between the receiver UE and the transmitter UE being less than the distance threshold, transmitting a feedback message to the transmitter UE.

An aspect of the disclosure includes a transmitter UE, including: a memory; at least one transceiver; and at least one processor communicatively coupled to the memory and the at least one transceiver, the at least one processor configured to: determine a first zone ID corresponding to a first zone in which the transmitter UE is located; determine a distance threshold based on a distance requirement of an application associated with the transmitter UE; determine a second zone ID based on the first zone ID, the distance threshold, a size of the first zone, or any combination thereof; and cause the at least one transceiver to transmit the second zone ID and the distance threshold to one or more receiver UEs.

An aspect of the disclosure includes a receiver UE, including: a memory; at least one transceiver; and at least one processor communicatively coupled to the memory and the at least one transceiver, the at least one processor configured to: receive, from a transmitter UE via the at least one transceiver, a second zone ID and a distance threshold; determine a location of the receiver UE; determine a distance between the receiver UE and the transmitter UE based on the second zone ID and the location of the receiver UE; and cause the at least one transceiver to transmit, based on the distance between the receiver UE and the transmitter UE being less than the distance threshold, a feedback message to the transmitter UE.

An aspect of the disclosure includes a transmitter UE, including: means for determining a first zone ID corresponding to a first zone in which the transmitter UE is located; means for determining a distance threshold based on a distance requirement of an application associated with the transmitter UE; means for determining a second zone ID based on the first zone ID, the distance threshold, a size of the first zone, or any combination thereof; and means for transmitting the second zone ID and the distance threshold to one or more receiver UEs.

An aspect of the disclosure includes a receiver UE, including: means for receiving, from a transmitter UE, a second zone ID and a distance threshold; determining a location of the receiver UE; means for determining a distance between the receiver UE and the transmitter UE based on the second zone ID and the location of the receiver UE;

means for transmitting, based on the distance between the receiver UE and the transmitter UE being less than the distance threshold, a feedback message to the transmitter UE.

An aspect of the disclosure includes a non-transitory computer-readable medium storing computer-executable instructions, the computer executable instructions including: at least one instruction instructing a transmitter UE to determine a first zone ID corresponding to a first zone in which the transmitter UE is located; at least one instruction instructing the transmitter UE to determine a distance threshold based on a distance requirement of an application associated with the transmitter UE; at least one instruction instructing the transmitter UE to determine a second zone ID based on the first zone ID, the distance threshold, a size of the first zone, or any combination thereof; and at least one instruction instructing the transmitter UE to transmit the second zone ID and the distance threshold to one or more receiver UEs.

An aspect of the disclosure includes a non-transitory computer-readable medium storing computer-executable instructions, the computer executable instructions including: at least one instruction instructing a receiver UE to receive, from a transmitter UE, a second zone ID and a distance threshold; at least one instruction instructing the receiver UE to determine a location of the receiver UE; at least one instruction instructing the receiver UE to determine a distance between the receiver UE and the transmitter UE based on the second zone ID and the location of the receiver UE; at least one instruction instructing the receiver UE to transmit, based on the distance between the receiver UE and the transmitter UE being less than the distance threshold, a feedback message to the transmitter UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
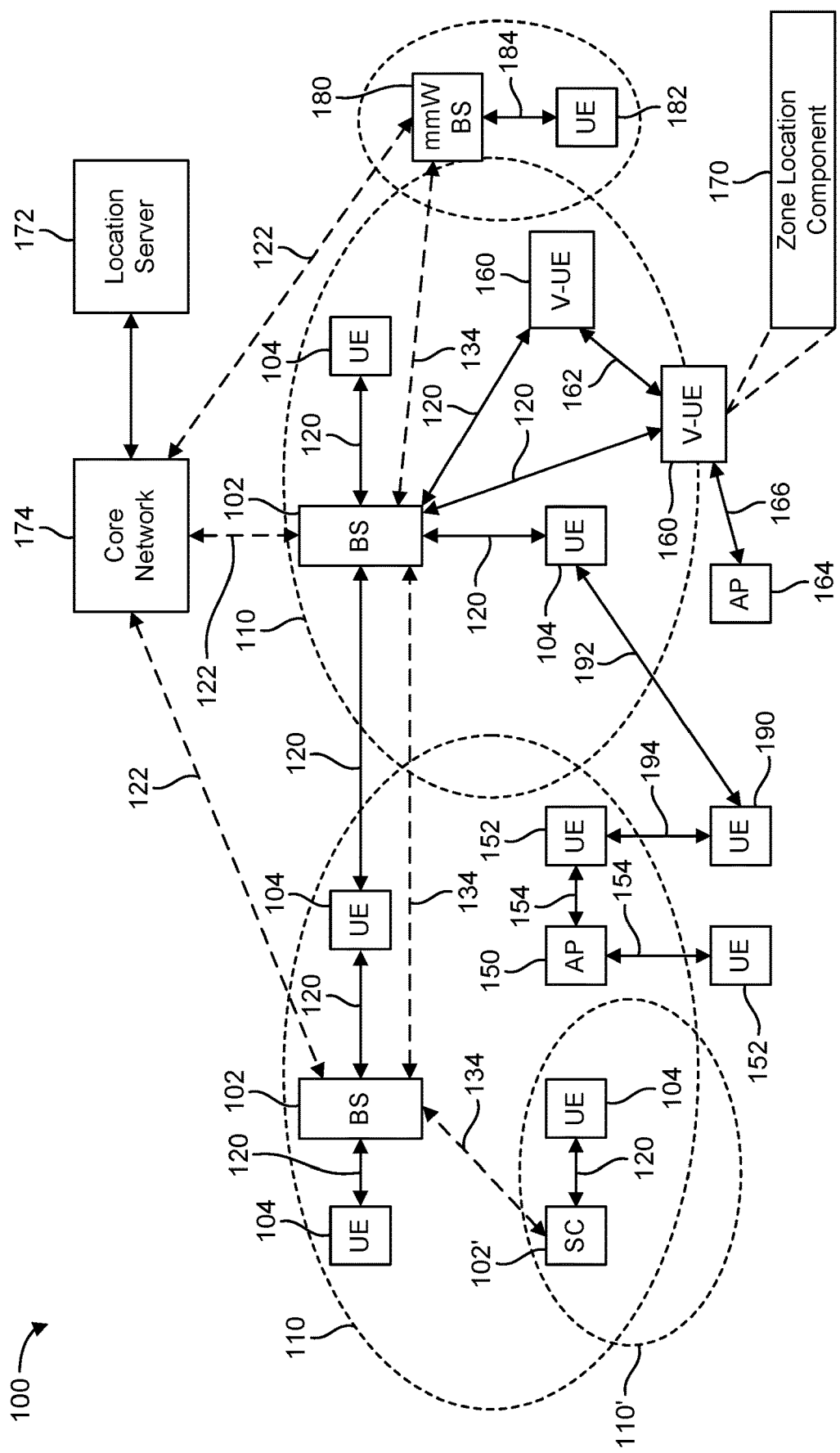
FIG. 1 illustrates an exemplary wireless communications system in accordance with one or more aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device,"

a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or next generation core (NGC)) through backhaul links 122, and through the core network 174 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINK), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier, while containing necessary signaling information and signals, may not include UE-specific information in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless unicast sidelink 162, with a roadside access point 164 over a sidelink 166, or with UEs 104 over a sidelink 168 using P2P/D2D protocols (e.g., "PC5," an LTE V2X D2D interface) or ProSe direct communications. Sidelink communication may be used for D2D media-sharing, V2V communication, V2X communication (e.g., cellular V2X (cV2X) communication, enhanced V2X (eV2X) communication, etc.), emergency rescue applications, etc. One or more of a group of V-UEs 160 utilizing D2D communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via D2D communications may utilize a one-to-many (1:M) system in which each V-UE 160 transmits to every other V-UE 160 in the group. In some cases, a base station 102 facilitates the scheduling of resources for D2D communications. In other cases, D2D communications are carried out between V-UEs 160 without the involvement of a base station 102.

In an aspect, the V-UEs 160, and any other UE illustrated in FIG. 1, may have a zone location component 170. The zone location component 170 may be a hardware, software, or firmware component that, when executed, causes the V-UE 160 to perform the operations described herein. For example, the zone location component 170 may be a software module stored in a memory of the V-UE 160 and executable by a processor of the V-UE 160. As another example, the zone location component 170 may be a hardware circuit (e.g., an ASIC, a field programmable gate array (FPGA), etc.) within the V-UE 160.

In an aspect, the sidelinks 162, 166, 168 may operate over a communication medium of interest, which may be shared with other communications between other vehicles and/or infrastructure access points, as well as other RATs. A "medium" may be composed of one or more frequency, time, and/or space communication resources (e.g., encompassing one or more channels across one or more carriers) associated with communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 illustrates two of the UEs as V-UEs (V-UEs 160), any of the illustrated UEs (e.g., UEs 104, 152, 182, 190) may be V-UEs. In addition, although UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

Figure 2A:
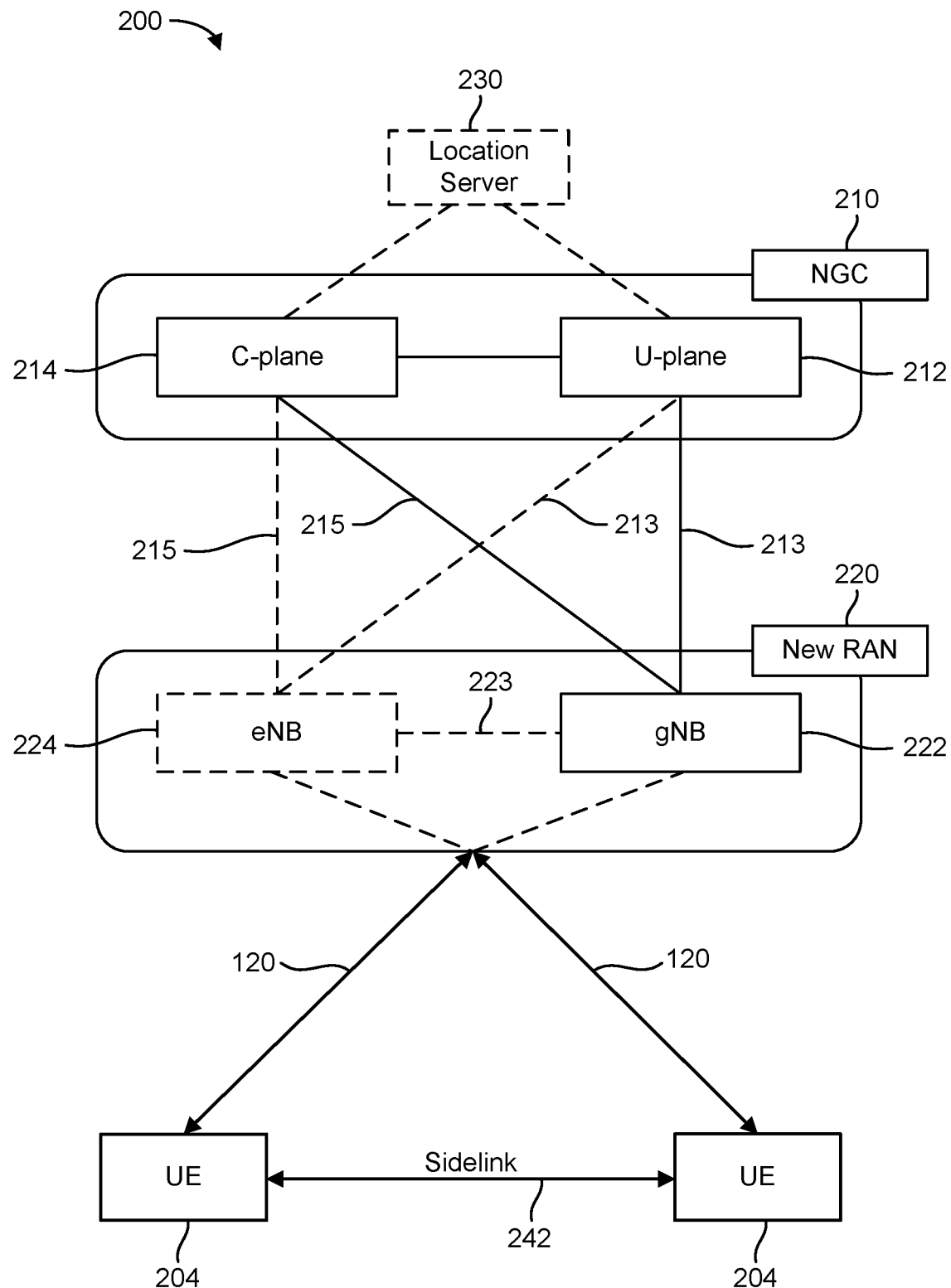
FIGS. 2A and 2B illustrate example wireless network structures, according to various aspects.

According to various aspects, FIG. 2A illustrates an exemplary wireless network structure 200. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may have one or more gNBs 222 but no eNBs 224, while other configurations may include one or more of both eNBs 224 and gNBs 222. Either gNB 222 or eNB 224 may communicate with UEs 204 (e.g., any of the UEs depicted in FIG. 1). In an aspect, two UEs 204 may communicate with each other over a wireless unicast sidelink 242, which may correspond to wireless unicast sidelink 162 in FIG. 1.

Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
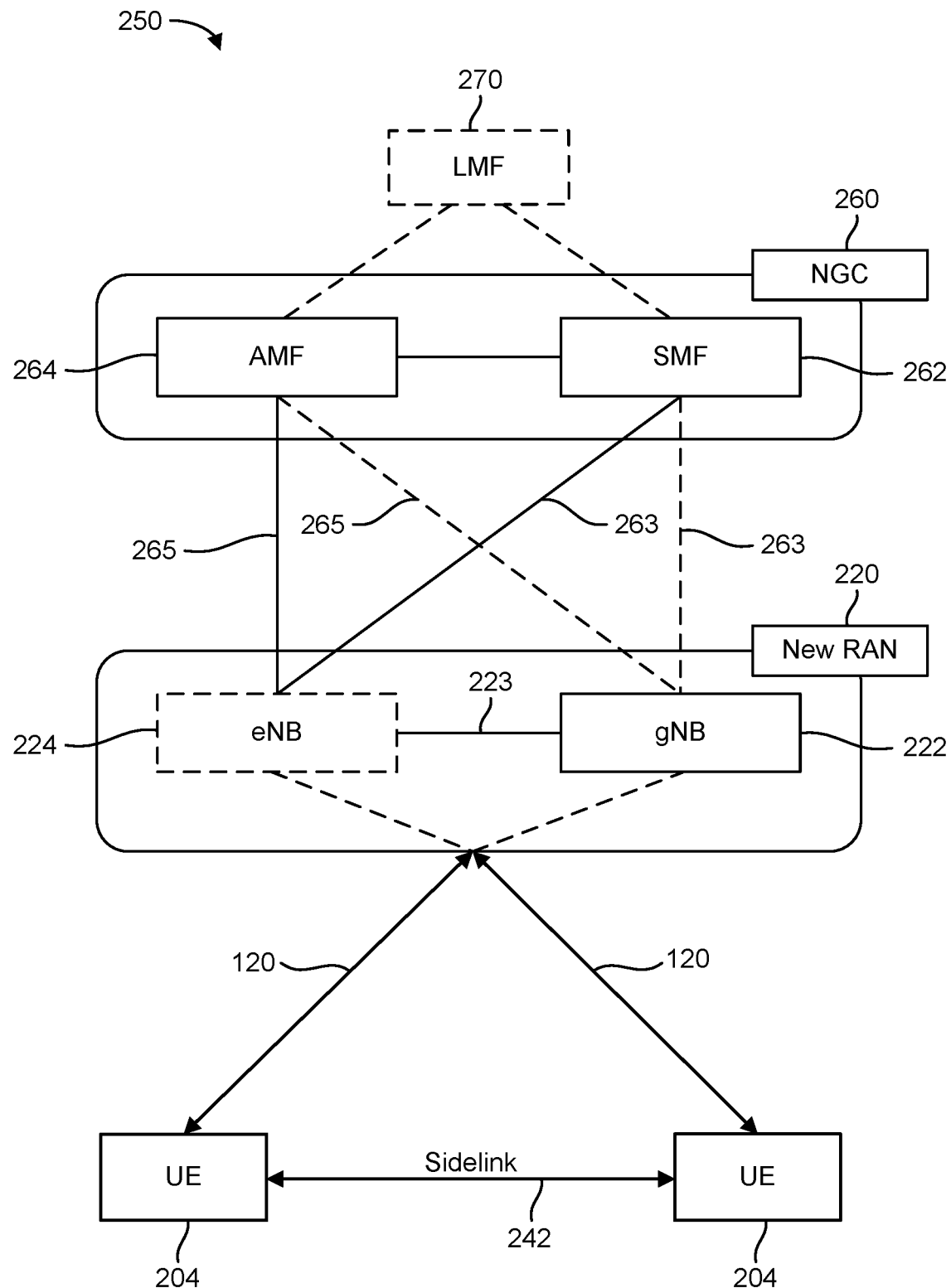

According to various aspects, FIG. 2B illustrates another exemplary wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may have one or more gNBs 222 and no eNBs 224, while other configurations may include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface. In an aspect, two UEs 204 may communicate with each other over a wireless unicast sidelink 242, which may correspond to wireless unicast sidelink 162 in FIG. 1.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
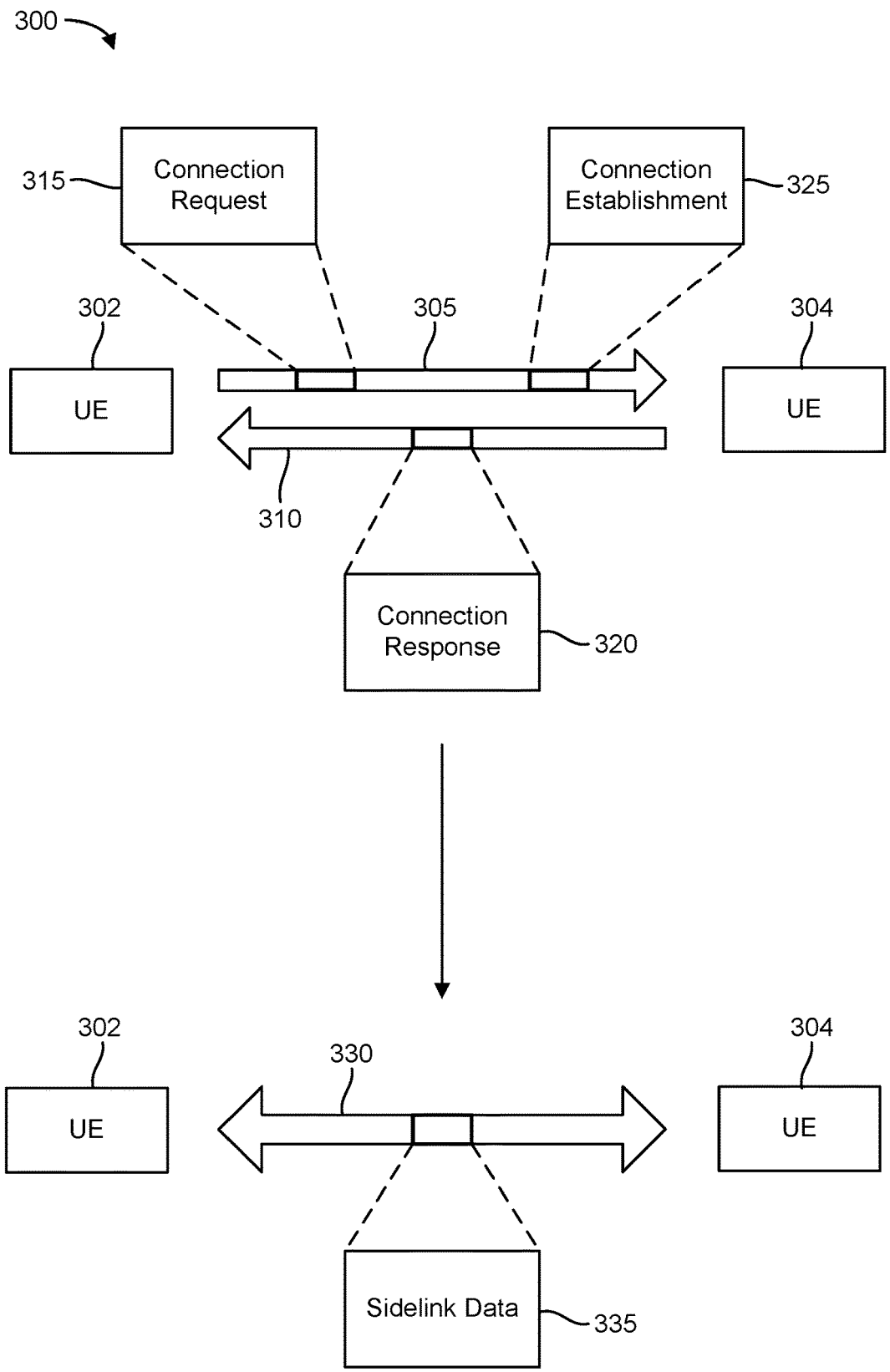
FIG. 3 illustrates an example of a wireless communications system that supports unicast sidelink establishment in accordance with aspects of the disclosure.

FIG. 3 illustrates an example of a wireless communications system 300 that supports unicast sidelink establishment in accordance with aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As a specific example, UEs 302 and 304 may correspond to V-UEs 160 in FIG. 1. In the example of FIG. 3, the UE 302 may attempt to establish a unicast connection over a sidelink with UE 304, which may be a V2X communication link between UE 302 and UE 304. Additionally or alternatively, the unicast connection over the sidelink may generally be used for sidelink communications between any two UEs. Thus, the established sidelink connection may correspond to sidelinks 162 and/or 168 in FIG. 1 and/or wireless unicast sidelink 242 in FIGS. 2A and 2B. In some cases, UE 302 may be referred to as an initiating UE that initiates the unicast connection procedure, and UE 304 may be referred to as a target UE that is targeted for the unicast connection procedure by the initiating UE.

For establishing the unicast connection, access stratum (AS) (a functional layer in the UMTS and LTE protocol stacks between the RAN and the UE that is responsible for transporting data over wireless links and managing radio resources, also referred to as "Layer 2" or "L2") parameters may be configured and negotiated between UE 302 and UE 304. For example, a transmission and reception capability matching may be negotiated between UE 302 and UE 304. Each UE may have different capabilities (e.g., transmission and reception capabilities, 64 quadrature amplitude modulation (QAM), transmission diversity, carrier aggregation (CA) capabilities, supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the unicast connection establishment. Conventionally, UE 302 may identify and locate candidates for unicast communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in a NR sidelink broadcast). In some cases, UE 304 may include one or more parameters for itself in the service announcement, including connection parameters and/or capabilities it possesses. UE 302 may then monitor for and receive the broadcasted service announcement to identify potential UEs for corresponding unicast connections. In some cases, UE 302 may identify the potential UEs based on the capabilities each UE indicates in their respective service announcements.

The service announcement may include information to assist UE 302 (e.g., or any initiating UE) to identify the UE transmitting the service announcement (UE 304 in the example of FIG. 3). For example, the service announcement may include channel information where direct communication requests may be sent. In some cases, the channel information may be specific to RAT (e.g., LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential unicast connection target (UE 304 in the example of FIG. 3), the initiating UE (UE 302 in the example of FIG. 3) may transmit a connection request 315 to the identified target UE 304. In some cases, the connection request 315 may be a first RRC message transmitted by UE 302 to request a unicast connection with UE 304 (e.g., an RRCDirectConnectionSetupRequest message). For example, the unicast connection may utilize the PC5 interface for the unicast link, and the connection request 315 may be an RRC connection setup request message. Additionally, UE 302 may use a sidelink signaling radio bearer 305 to transport the connection request 315.

After receiving the connection request 315, UE 304 may determine whether to accept or reject the connection request 315. UE 304 may base this determination on a transmission/reception capability, an ability to accommodate the unicast connection over the sidelink, a particular service indicated for the unicast connection, the contents to be transmitted over the unicast connection, or a combination thereof. For example, if UE 302 wants to use a first RAT to transmit or receive data, but UE 304 does not support the first RAT, then UE 304 may reject the connection request 315. Additionally or alternatively, UE 304 may reject the connection request 315 based on being unable to accommodate the unicast connection over the sidelink due to a limited radio resource, a scheduling issue, etc. Accordingly, UE 304 may transmit an indication of whether the request is accepted or rejected in a connection response 320. Similar to UE 302 and the connection request 315, UE 304 may use a sidelink signaling radio bearer 310 to transport the connection response 320. Additionally, the connection response 320 may be a second RRC message transmitted by UE 304 in response to the connection request 315 (e.g., an RRCDirectConnectionResponse message).

In some cases, sidelink signaling radio bearers 305 and 310 may be the same sidelink radio signal bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that UE 304 accepted the connection request 315, UE 302 may then transmit a connection establishment 325 message on the sidelink signaling radio bearer 305 to indicate that the unicast connection setup is complete. In some cases, the connection establishment 325 may be a third RRC message (e.g., an RRCDirectConnectionSetupComplete message). Each of the connection request 315, the connection response 320, and the connection establishment 325 may use a basic capability when being transported from one UE to the other UE to enable each UE to be able to receive and decode the corresponding transmission (e.g., RRC message).

Additionally, identifiers may be used for each of the connection request 315, the connection response 320, and the connection establishment 325 (e.g., the RRC signaling). For example, the identifiers may indicate which UE 302/304 is transmitting which message and/or which UE 302/304 the message is intended for. For physical (PHY) channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a PHY layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, UE 302 and/or UE 304 may include RLC parameters when establishing the unicast connection to set an RLC context of the unicast connection. For example, the RLC context may indicate whether an AM (e.g., a reordering timer (t-reordering) is used) or an unacknowledged mode (UM) is used for the RLC layer of the unicast communications.

Additionally, UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1 and/or wireless unicast sidelink 242 in FIGS. 2A and 2B. In some cases, the sidelink data 335 may include RRC messages transmitted between the two UEs 302 and 304. To maintain this unicast connection on sidelink 330, UE 302 and/or UE 304 may transmit a keep alive message (e.g., RRCDirectLinkAlive message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
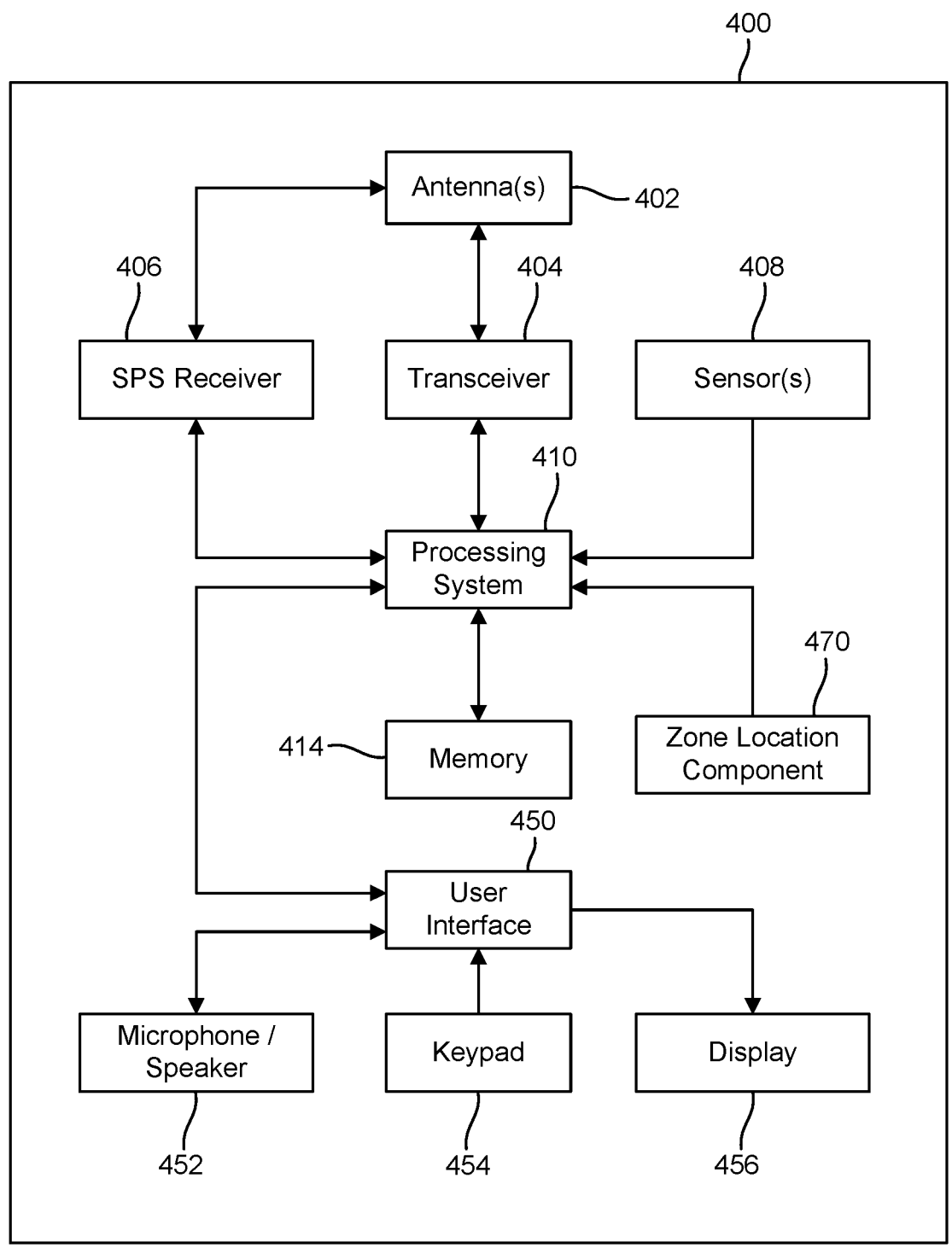
FIG. 4 is a block diagram illustrating various components of an exemplary UE according to at least one aspect of the disclosure.

FIG. 4 is a block diagram illustrating various components of an exemplary UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 for communicating with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., C-V2X or IEEE 802.11p) over one or more communication links (e.g., communication links 120, sidelinks 162, 166, 168, mmW communication link 184). The transceiver 404 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 cannot simultaneously receive or transmit at a given time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 for receiving satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to a processing system 410 to provide information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processing system 410 may include one or more microprocessors, microcontrollers, ASICs, processing cores, digital signal processors, or the like that provide processing functions, as well as other calculation and control functionality. The processing system 410 may include any form of logic suitable for performing, or causing the components of the UE 400 to perform, at least the techniques provided herein.

The processing system 410 may also be coupled to a memory 414 for storing data and software instructions for executing programmed functionality within the UE 400. The memory 414 may be on-board the processing system 410 (e.g., within the same integrated circuit (IC) package), and/or the memory 414 may be external to the processing system 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 provides for voice communication services with the UE 400. The keypad 454 comprises any suitable buttons for user input to the UE 400. The display 456 comprises any suitable display, such as, for example, a backlit liquid crystal display (LCD), and may further include a touch screen display for additional user input modes.

In an aspect, the UE 400 may include a zone location component 470 coupled to the processing system 410. The zone location component 470 (which may correspond to zone location component 170 in FIG. 1) may be a hardware, software, or firmware component that, when executed, causes the UE 400 to perform the operations described herein. For example, the zone location component 470 may be a software module stored in memory 414 and executable by the processing system 410. As another example, the zone location component 470 may be a hardware circuit (e.g., an ASIC, an FPGA, etc.) within the UE 400.

In sidelink communications between two UEs (e.g., UE 302 and UE 304 in FIG. 3), the geographic location of the transmitter UE may be useful to the receiver UE. For example, it may be useful for a receiver UE to determine the distance between the two UEs when determining whether to provide distance-based HARQ feedback to the transmitter UE.

In V2V communications, the concept of a geographic zone was introduced to facilitate the signaling of UE location. In zone-based positioning, the surface of the earth is partitioned into a plurality of zones based on global navigation satellite system (GNSS) positioning. In an exemplary implementation, each zone has a size of 50-by-50 meters. Zones may be grouped into zone areas or other pluralities of zones. For example, a zone area may have a size of 32-by-32 zones. Each zone in a zone area may be uniquely identifiable by a zone identifier (ID). Thus, for a 32-by-32 zone area (having 32*32=1024 zones), a zone ID may have a value from 0 to 1023. In that case, a zone ID may be represented by 10 bits (i.e., $2^{10}$=1024). Note that zones are used to indicate a UE's position because the signaling overhead (e.g., number of bits) needed to transmit the UE's actual position (i.e., latitude, longitude, and/or altitude) is not acceptable at lower layers.

An issue with zone-based positioning is that the zone indication may cause confusion at a receiver UE due to the wraparound of zone areas. That is, as discussed further below with reference to FIG. 5, adjacent zone areas may reuse the same zone IDs. For example, if a zone ID is represented by 10 bits, allowing up to 1024 unique zone IDs, and adjacent zone areas include 1024 zones, each zone area will necessarily have to reuse the same 1024 zone IDs. This wraparound issue is especially problematic when a receiver UE needs to determine the distance to a transmitter UE based on the zone ID received from the transmitter UE, but the receiver UE does not know to which zone area the indicated zone belongs.

Figure 5:
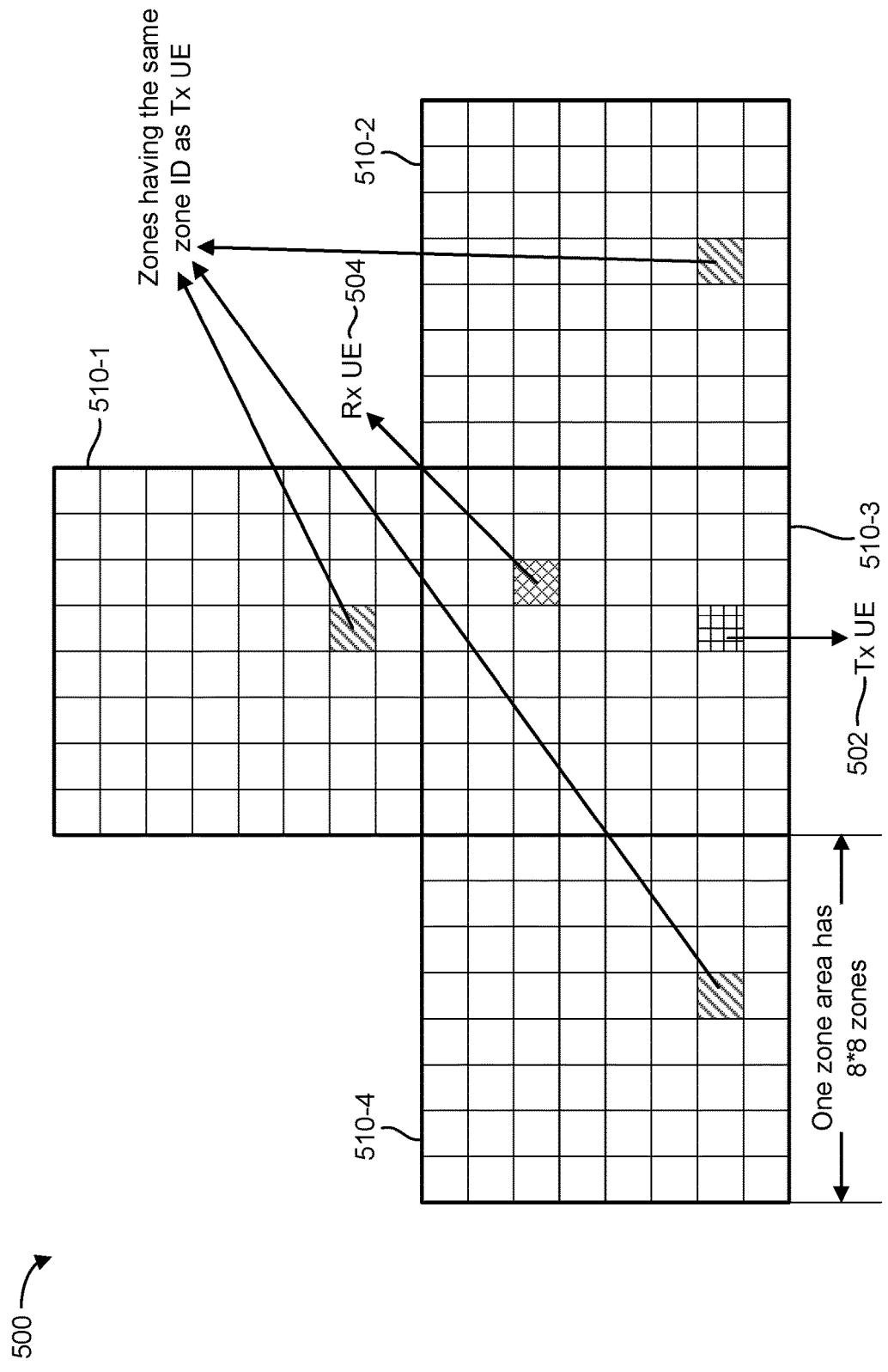
FIG. 5 is a diagram of an exemplary wraparound scenario, according to aspects of the disclosure.

FIG. 5 is a diagram 500 of an exemplary wraparound scenario, according to aspects of the disclosure. In the example of FIG. 5, each of four zone areas 510-1 to 510-4 (collectively, zone areas 510) has a size of 8-by-8 (64) zones, meaning that a 6-bit zone ID value (i.e., log 2(8*8)=6, or $2^6$=8×8=64) is needed to uniquely identify a zone. A receiver UE 504 is located in the black zone of zone area 510-3, and receives a zone ID from a transmitter UE 502 that indicates the transmitter UE's 502 location. The indicated zone ID corresponds to each of the shaded zones in the zone areas 510, due to the reuse of zone IDs across zone areas. However, the receiver UE 504 may not know whether the transmitter UE 502 is in the shaded zone within the same zone area as the receiver UE 504 (i.e., zone area 510-3) or, due to wraparound, whether it is in the same zone (i.e., having the same zone ID) within an adjacent zone area (one of zone areas 510-1, 510-2, or 510-4). If the transmitter UE's 504 zone is used to determine the distance between the receiver UE 504 and the transmitter UE 502, this uncertainty would make it difficult, if not impossible, for the receiver UE 504 to calculate that distance. As an example, when the distance is used by the receiver UE 504 to determine whether it needs to send HARQ feedback to the transmitter UE 502 (e.g., where the receiver UE 504 is expected to send the HARQ feedback when the distance is less than a threshold), the receiver UE 504 may make the wrong decision.

As will be appreciated, if UE 502 were to transmit both an identifier of its zone area (i.e., zone area 510-3) and its zone ID within that zone area, there would be no ambiguity regarding in which zone the UE 502 is located. However, this approach would involve significant overhead, as it would necessitate transmitting both the zone ID and a second identifier for the zone area 510-3.

Accordingly, the present disclosure provides techniques to resolve the ambiguity of reusing zone IDs across zone areas without specifying the zone area. These techniques enable a UE to indicate its location with a zone ID but without changing the physical zone size or increasing signaling overhead.

In an aspect, a zone area with a much larger size (e.g., 256-by-256 zones) is configured at a transmitter UE. Each zone area should be large enough that the wraparound issue would not affect a receiver UE's HARQ feedback decision. That is, the zone area should be large enough that it would be impossible for signals from more than one unique zone (i.e., zones in different zone areas having the same zone ID) to reach the receiver UE.

Each transmitter UE may have its own HARQ feedback distance requirement, based on, for example, distance requirements of a given application. For example, one application may have a 100 meter distance requirement, while another application may have a 500 meter distance requirement. The transmitter UE may signal a distance threshold $D_{HARQ}$ based on this distance requirement, which is the minimum range to exclude HARQ feedback. That is, a receiver UE is expected to send HARQ feedback to the transmitter UE if its distance from the transmitter UE is less than $D_{HARQ}$.

Adjacent zones in the large zone area may be grouped into zone groups having a group zone ID, as illustrated below in FIG. 6. The zone ID of an individual zone is referred to herein as a "first zone ID," an "individual zone ID," or simply a "zone ID," and the ID of a group of adjacent zones within a large zone area is referred to herein as a "second zone ID" or a "zone group ID." As such, each zone may be identified by a first zone ID unique to itself and a second zone ID that it shares with one or more other adjacent zones of a group of zones.

Figure 6:
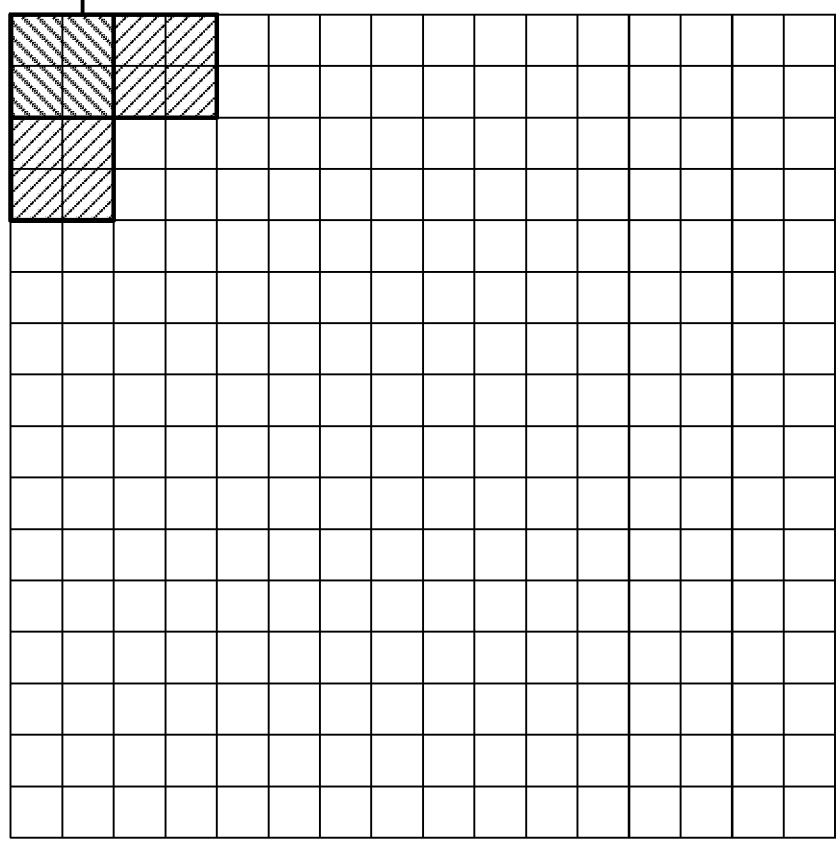
FIG. 6 is a diagram of a 16-by-16 zone area in which groups of four zones are combined into a zone group and assigned a second zone ID, according to aspects of the disclosure.

FIG. 6 is a diagram 600 of a 16-by-16 zone area in which groups of four zones are combined into zone groups and assigned second zone IDs, according to aspects of the disclosure. The number of zones that are combined into a group of adjacent zones is based on the distance threshold $D_{HARQ}$. For example, the larger the value of $D_{HARQ}$, the more zones there may be in a group of adjacent zones that share the same second zone ID. As a specific example, if each zone is 50-by-50 meters and $D_{HARQ}$ is 100 meters, then, as illustrated in FIG. 6, a group of adjacent zones having the same second zone ID may comprise a group of four adjacent zones.

When transmitting its location to other UEs (e.g., in BSMs), a transmitter UE signals the second zone ID, rather than the first zone ID. This zone ID value may be indicated in lower layer signaling, such as in sidelink control information (SCI). This means that the zone ID received at a receiver UE may correspond to multiple adjacent zones. Because multiple zones are combined into a group of adjacent zones, the accuracy of the transmitter UE's location may be degraded, and therefore, the distance to the transmitter UE that the receiver UE is able to calculate may be similarly degraded. However, the location accuracy should still be sufficient enough for HARQ feedback distance determination purposes. For example, if each zone is 50-by-50 meters and $D_{HARQ}$ is 100 meters, then a second zone ID corresponding to a group of four zones (corresponding to a geographic area of 100-by-100 meters) is sufficient to determine whether the receiver UE is within 100 meters of the transmitter UE and should send HARQ feedback.

The above-disclosed technique has a number of benefits, including reduced signaling overhead for the indication of the transmitter UE's location (i.e., the identifier of a group of adjacent zones in which the transmitter UE is located, the second zone ID). As will be appreciated, the greater the value of $D_{HARQ}$, the more adjacent zones that can be grouped together, and therefore, the fewer number of zone groups and the fewer number of bits needed for the second zone ID.

From the perspective of the transmitter UE, the transmitter UE first determines its location (e.g., from GNSS). It then determines the corresponding zone and first zone ID based on the determined GNSS location and one or more rules to form zones and first zone IDs. In an aspect, the mapping between a zone and a first zone ID may be one-to-one. That is, in a zone area, every zone has a unique first zone ID. A rule to form zones may be to partition the earth's surface into a specified number of zone areas, and to partition each zone area into whatever number of zones of a specified size (e.g., 50-by-50 meters) will fit in the zone area. First zone IDs may be assigned to zones in the zone area left to right and top to bottom, and each zone ID may comprise the number of bits needed to uniquely identify each zone in the zone area (e.g., 10 bits for a zone area of 1024 zones).

Next, the transmitter UE determines a distance threshold for, for example, HARQ feedback purposes. The transmitter UE then determines a second zone ID based at least on one or more of the first zone ID, the distance threshold, and the zone size. The transmitter UE transmits the second zone ID, rather than the first zone ID, and the distance threshold to nearby receiver UE(s). The second zone ID and the distance threshold may be transmitted in, for example, SCI.

In an aspect, the number of bits of the first zone ID may be n bits, and the number of bits of the second zone ID may be m bits (where m is less than or equal to n). Further, n/2 bits may represent the x-axis of the first zone within a zone area or other plurality of zones, n/2 bits may represent the y-axis of the first zone, m/2 bits may represent the x-axis of the second zone ID, and m/2 bits may represent a y-axis of the second zone ID. In an aspect, the second zone ID may be a subset of bits of the first zone ID. In an aspect, the subset of bits of the first zone ID may represent one or more most significant bits of the first zone ID.

Referring to determining the second zone ID from the first zone ID in greater detail, the number of adjacent zones ($n_{zones}$) that may share the same second zone ID may be based on the distance threshold ($D_{HARQ}$) and the zone size ($L_{zone}$). In principle, the larger the distance threshold, the more adjacent zones that can share the same second zone ID. For example, when $D_{HARQ} \leq L_{zone}$, each zone ($1^2$) has a unique zone ID. When $L_{zone} < D_{HARQ} \leq 2L_{zone}$, then every four ($2^2$) zones share the same second zone ID. When $2L_{zone} < D_{HARQ} \leq 3L_{zone}$, then every nine ($3^2$) zones share the same second zone ID, and so on. This principle can be abstracted as $$n_{zones} = \left(\left\lceil \frac{D_{HARQ}}{L_{zone}} \right\rceil\right)^2.$$

As another example, when $D_{HARQ} \leq L_{zone}$, then each zone ($1^2$) has a unique zone ID. When $L_{zone} < D_{HARQ} \leq 2L_{zone}$, then every four ($2^2$) zones share the same zone ID. When $2L_{zone} < D_{HARQ} \leq 4L_{zone}$, then every 16 ($4^2$) zones share the same zone ID, and so on. This principle can be abstracted as $$n_{zones} = \left(2^{\left\lceil log2\left(\frac{D_{HARQ}}{L_{zone}}\right)\right\rceil}\right)^2.$$

In this way, every $n_{zones}$ adjacent zones are mapped to the same second zone ID.

The following is a detailed example. A first zone ID of $N_1=16$ bits can uniquely identify $2^{16}=256\times256$ zones in a zone area. A second zone ID of $N_2=10$ bits can be carried by SCI (i.e., the second zone ID is expressed by $N_2$ bits, and $N_1 > N_2$). It is determined (from $D_{HARQ}$ and $L_{zone}$) that every four adjacent zones can share the same second zone ID (i.e., $n_{zones}=4$, as illustrated in FIG. 6). For a first zone ID of bit length $N_1$ (i.e., 16 bits), the first $$\left(\frac{N_1}{2} = n = 8\right)$$

bits can indicate the zone location along the X-axis, and the second $$\left(\frac{N_1}{2} = n = 8\right)$$

bits can indicate the zone location along the Y-axis. Alternatively, the zones may simply be numbered from '1' to '256.' As such, each zone has a unique first zone ID in the zone area.

The second zone ID can be determined as follows. Assume the (decimal) value of the first $$\frac{N_1}{2}$$

bits in the first zone ID is $M_1^X$, and the (decimal) value of the second $$\frac{N_1}{2}$$

bits in the first zone ID is $M_1^Y$. The (decimal) value of the first $$\frac{N_2}{2} = e$$

bits in the second zone ID is determined as $$M_2^X = \mathrm{mod}\left(\frac{M_1^X}{2^{\left\lceil log2\left(\frac{D_{HARQ}}{L_{zone}}\right)\right\rceil}}, 2^{\frac{N_2}{2}}\right),$$

and the (decimal) value of the second $$\frac{N_2}{2} = e$$

bits in the second zone ID is determined as $$M_2^Y = \mathrm{mod}\left(\frac{M_1^Y}{2^{\left\lceil log2\left(\frac{D_{HARQ}}{L_{zone}}\right)\right\rceil}}, 2^{\frac{N_2}{2}}\right).$$

The effect of the above determination of the second zone ID is equivalent to every four zones sharing the same second zone ID, and the shared second zone ID being determined as the shared $N_2$ bits counting from the least significant bit (LSB) in the first zone IDs of the four zones making up the group of adjacent zones.

For example, assume $N_1=16$ and $N_2=10$. For the first zone ID, this would result in eight bits for the X-axis component and eight bits for the Y-axis component. For the second zone ID, this would result in five bits for the X-axis component and five bits for the Y-axis component. The five bits may be the last five bits (i.e., the five LSBs) of the eight bits of the first zone ID if a zone group has one zone, or the five bits counted from the second from the last bit of the eight bits of the first zone ID if a zone group has four zones, or the five bits counted from the third from the last bit of the eight bits of the first zone ID if a zone group has 16 zones. Thus, for example, if up to 10 bits are allowed for the second zone ID, and a zone group has four zones, then some of the LSBs and some of the most significant bits (MSBs) from first zone ID would be removed, and the remaining bits would be the second zone ID. However, if there is no constant number of bits constraint on the second zone ID, then the second zone ID can be the MSBs of the first zone ID regardless of the number of MSBs.

Figure 7:
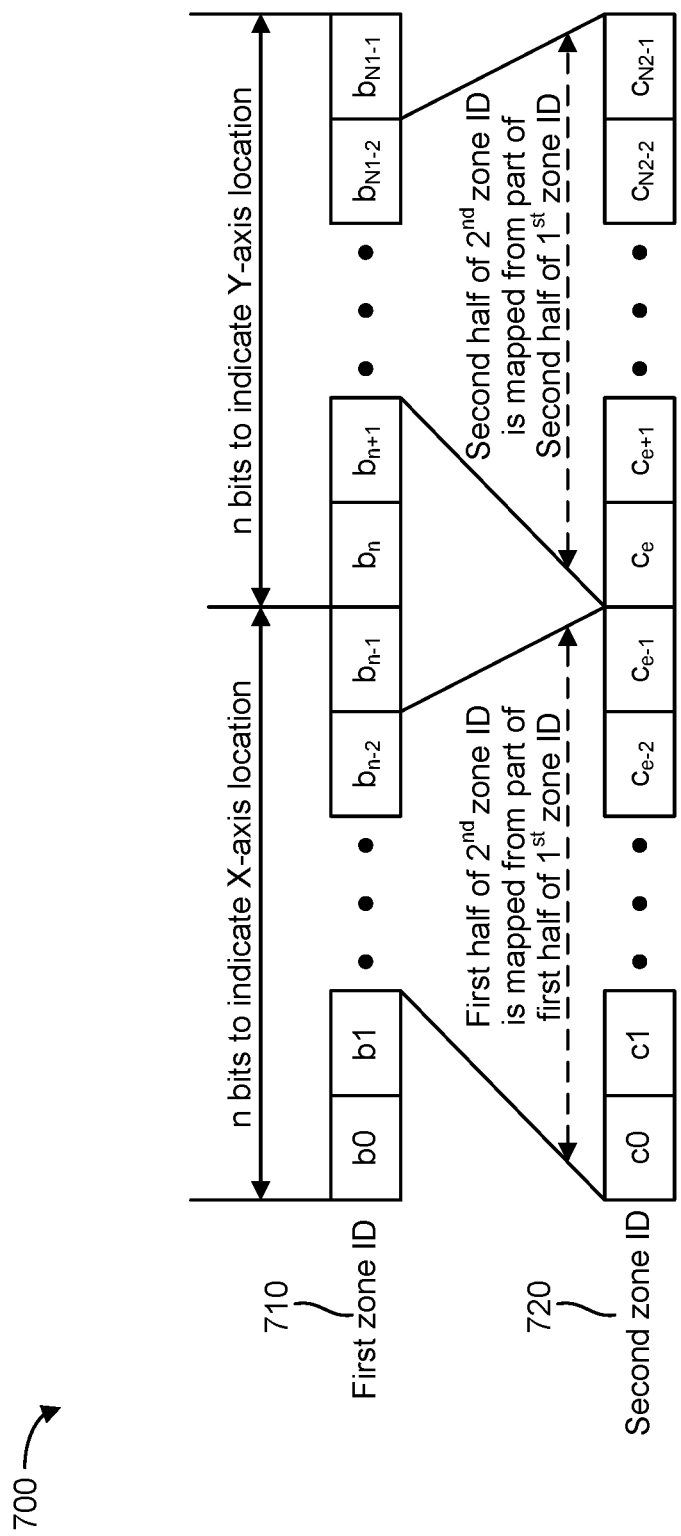
FIG. 7 illustrates how to determine the bits of a second zone ID from the bits of a first zone ID, according to aspects of the disclosure.

FIG. 7 is a diagram 700 illustrating how to determine the bits of a second zone ID 720 from the bits of a first zone ID 710, according to aspects of the disclosure. As illustrated in FIG. 7, the first n bits of the first zone ID 710 indicate the x-axis location of the zone within a zone area, and the second n bits of the first zone ID 710 indicate the y-axis location of the zone within the zone area. As discussed above, the first half of the second zone ID 720 is mapped from part (e.g., the e LSBs) of the first half (i.e., the first n bits) of the first zone ID 710. Likewise, the second half of the second zone ID 720 is mapped from part (e.g., the e LSBs) of the second half (i.e., the second n bits) of the first zone ID 710.

From the perspective of the receiver UE, the receiver UE receives, from a transmitter UE, a second zone ID and a HARQ feedback distance threshold. The receiver UE may determine the number of zones associated with the second zone ID based on the known size of a zone (e.g., 50-by-50 meters) and the HARQ feedback distance threshold. For example, if the HARQ feedback distance threshold is 100 meters, the receiver UE knows that there are four zones associated with the second zone ID. The receiver should know, or be able to determine, the location of the group of zones sharing the second zone ID based on the second zone ID (e.g., where the second zone ID indicates the x-y coordinates of the zone group) or by rule (e.g., where zone groups are numbered consecutively from top to bottom and left to right).

The receiver UE then determines the distance between itself and the transmitter UE. More specifically, the receiver UE may determine the transmitter UE's location based on the second zone ID and the number of zones in the zone group, which may be determined from the distance threshold. The receiver UE may not need to recover the first zone ID from the second zone ID, but rather, can simply determine the transmitter UE's location as the location of the zones associated with the second zone ID. The receiver UE's location may be expressed by the zone ID in which it is located or its actual location (e.g., as determined by GNSS). The receiver UE then transmits HARQ feedback to the transmitter UE if the determined distance is smaller than the received HARQ feedback distance threshold.

Figure 8:
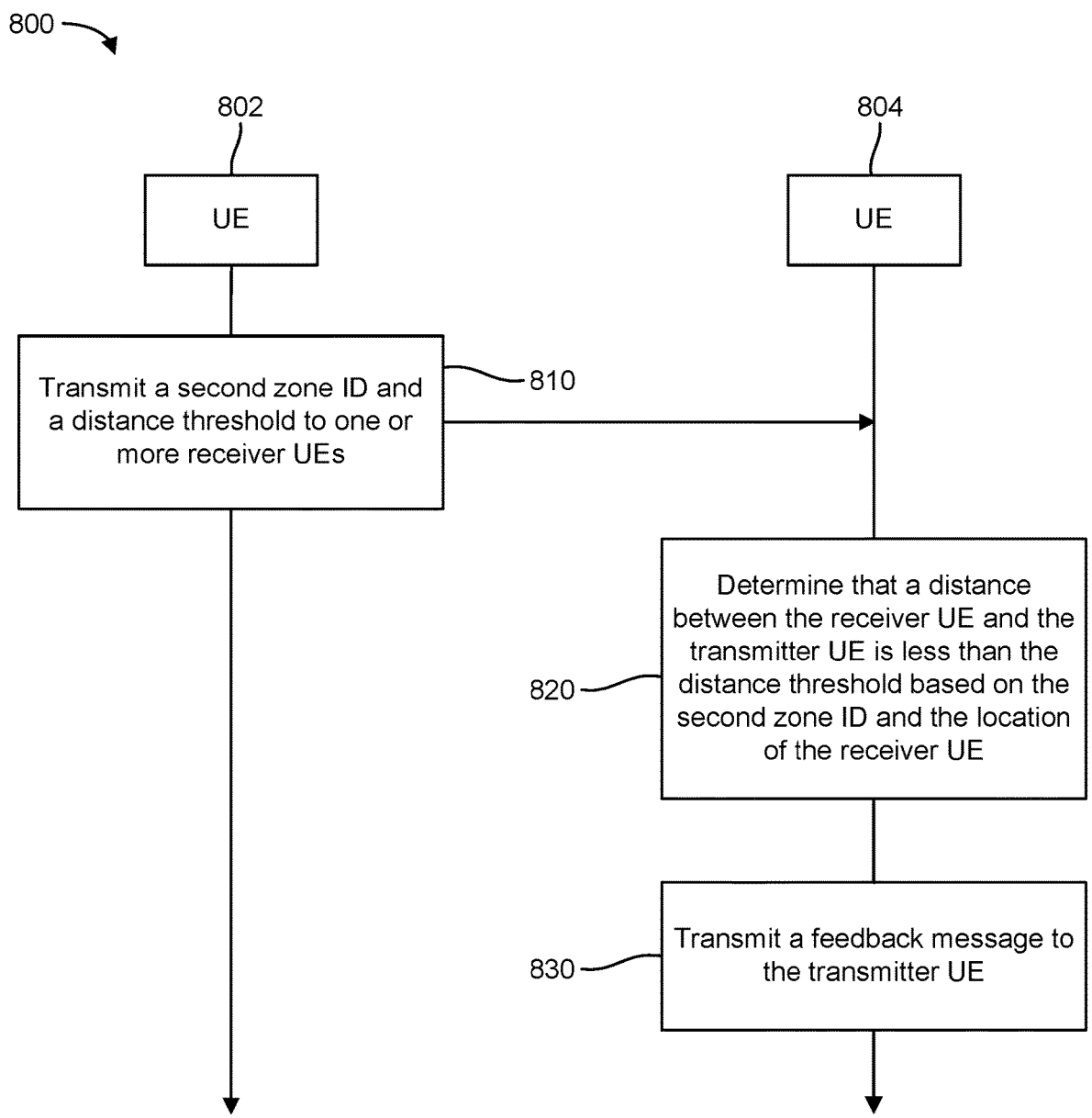
FIGS. 8 to 10 illustrate exemplary methods for wireless communication, according to aspects of the disclosure.

FIG. 8 illustrates an exemplary call flow 800 between a transmitter UE 802 and one or more receiver UEs 804, according to aspects of the disclosure. UEs 802 and 804 may correspond to any of the UEs described herein. As a specific example, UEs 802 and 804 may be V-UEs.

At 810, the transmitter UE 802 transmits a second zone ID and a distance threshold (e.g., a HARQ feedback distance threshold) to the one or more receiver UEs 804. The second zone ID and the distance threshold may be included in a BSM broadcasted by the transmitter UE 802.

At 820, the one or more receiver UEs 804 determine the distance between themselves and the transmitter UE is less than the distance threshold based on the second zone ID and the location of the respective receiver UE(s), and optionally, the zone size.

At 830, the one or more receiver UEs 804 transmit a feedback message (e.g., a HARQ feedback message) to the transmitter UE.

Figure 9:
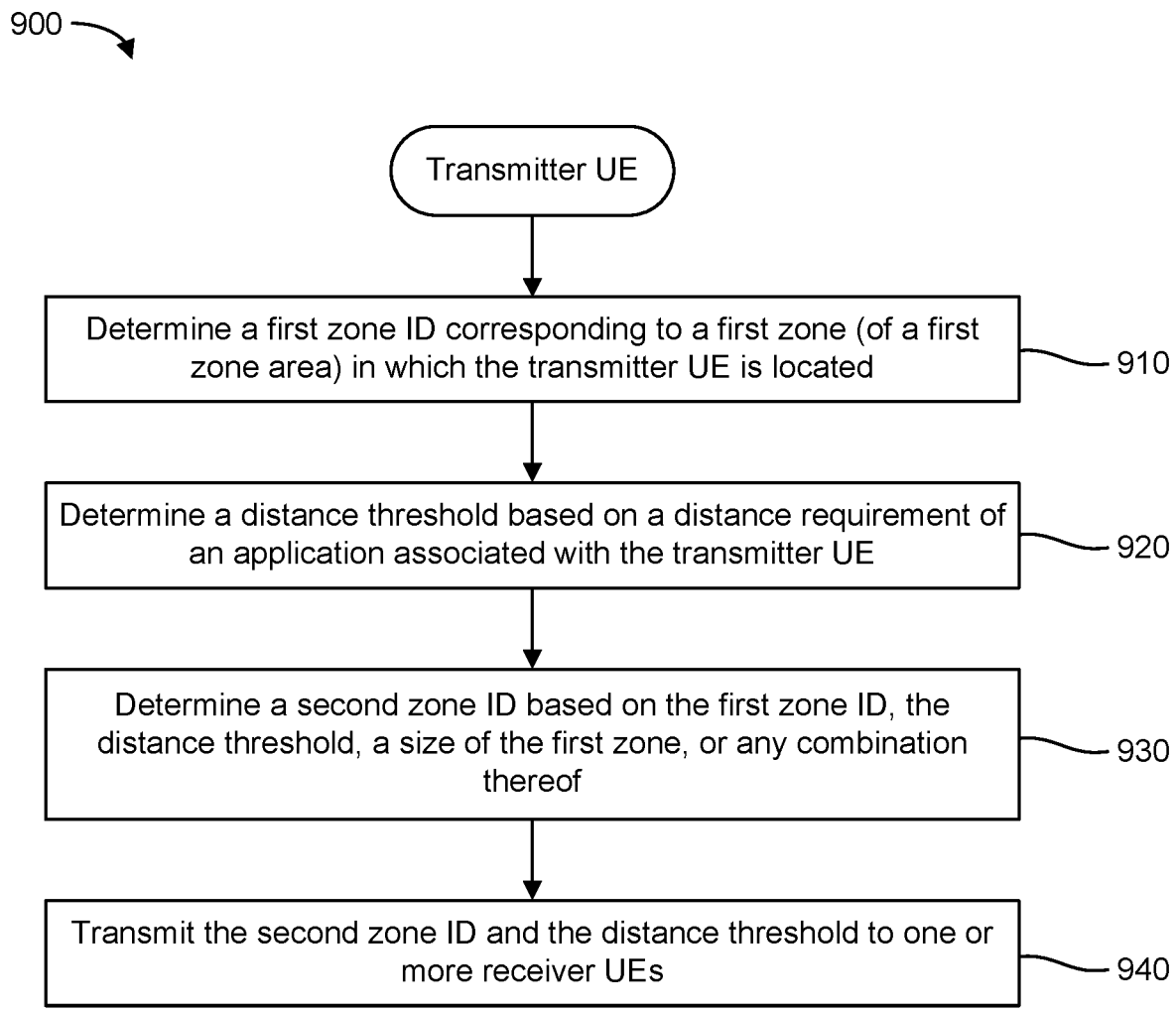

FIG. 9 illustrates a method 900 for wireless communication, according to aspects of the disclosure. The method 900 may be performed by a transmitter UE (e.g., any of the UEs described herein).

At 910, the transmitter UE determines a first zone ID corresponding to a first zone in which the transmitter UE is located. The first zone ID may be the x-y coordinates of the first zone within, for example, a zone area, a set of zones, or some plurality of zones, such as the first zone ID 710 in FIG. 7. In an aspect, operation 910 may be performed by transceiver 404, processing system 410, memory 414, and/or zone location component 470, any or all of which may be considered means for performing this operation.

At 920, the transmitter UE determines a distance threshold based on a distance requirement of an application (e.g., a navigation application, an autonomous driving application, or the like) associated with the transmitter UE. Alternatively, the distance requirement and/or distance threshold may be specified in the applicable standard. In an aspect, operation 920 may be performed by transceiver 404, processing system 410, memory 414, and/or zone location component 470, any or all of which may be considered means for performing this operation.

At 930, the transmitter UE determines a second zone ID (e.g., second zone ID 720 in FIG. 7) based on the first zone ID, the distance threshold, a size of the first zone, or any combination thereof. For example, the transmitter UE may determine the second zone ID as described with reference to FIG. 7. In an aspect, operation 930 may be performed by transceiver 404, processing system 410, memory 414, and/or zone location component 470, any or all of which may be considered means for performing this operation.

At 940, the transmitter UE transmits the second zone ID and the distance threshold to one or more receiver UEs, as at 810 of FIG. 8. In an aspect, the distance threshold may not be necessary if, for example, it is specified in the applicable standard. In an aspect, operation 940 may be performed by transceiver 404, processing system 410, memory 414, and/or zone location component 470, any or all of which may be considered means for performing this operation.

Figure 10:
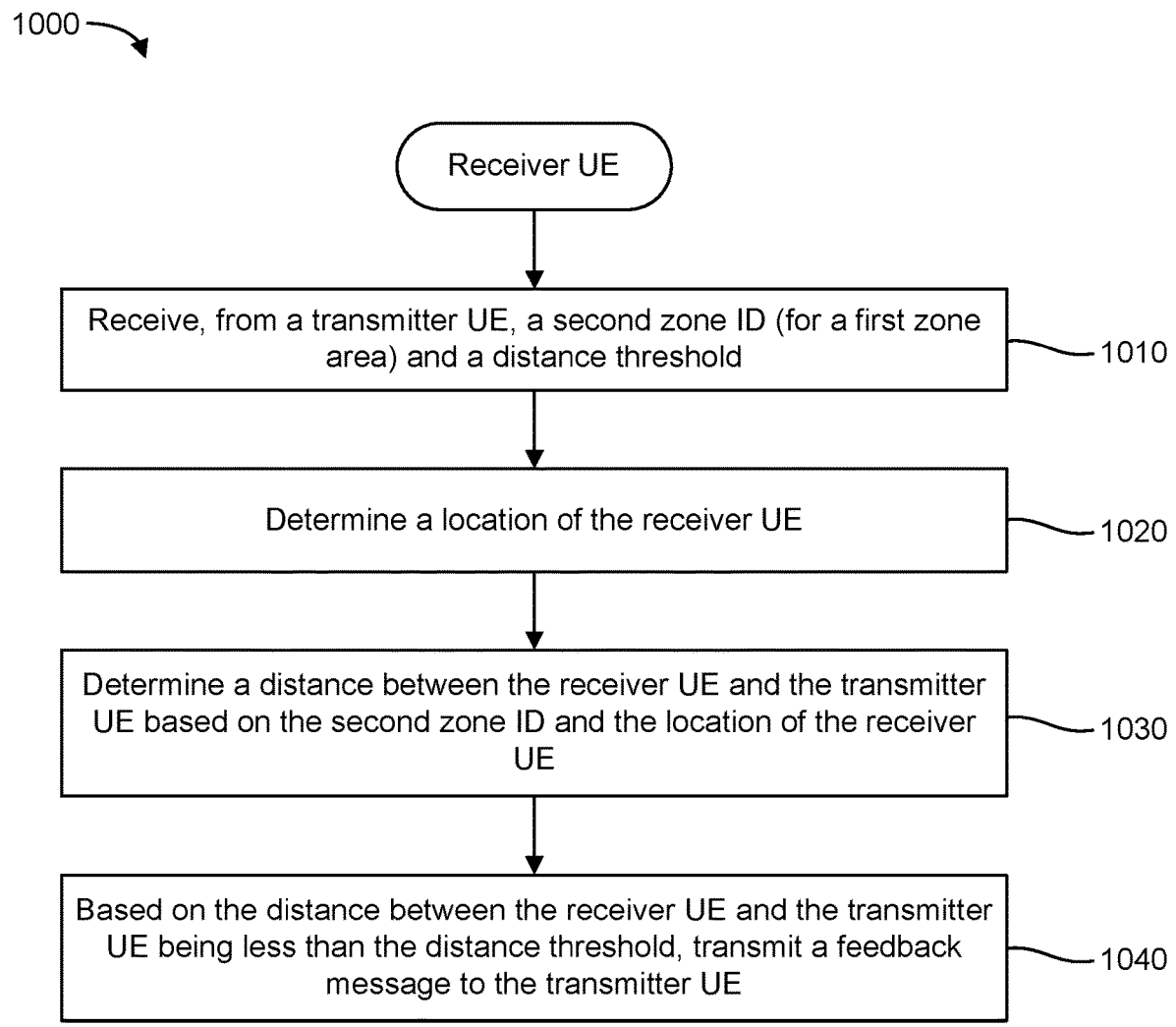

FIG. 10 illustrates a method 1000 for wireless communication, according to aspects of the disclosure. The method 1000 may be performed by a receiver UE (e.g., any of the UEs described herein).

At 1010, the receiver UE receives, from a transmitter UE, a second zone ID and a distance threshold. In an aspect, operation 1010 may be performed by transceiver 404, processing system 410, memory 414, and/or zone location component 470, any or all of which may be considered means for performing this operation.

At 1020, the receiver UE determines a location of the receiver UE. In an aspect, operation 1020 may be performed by transceiver 404, processing system 410, memory 414, and/or zone location component 470, any or all of which may be considered means for performing this operation.

At 1030, the receiver UE determines a distance between the receiver UE and the transmitter UE based on the second zone ID and the location of the receiver UE. In an aspect, operation 1030 may be performed by transceiver 404, processing system 410, memory 414, and/or zone location component 470, any or all of which may be considered means for performing this operation.

At 1040, the receiver UE transmits, based on the distance between the receiver UE and the transmitter UE being less than the distance threshold, a feedback message to the transmitter UE. In an aspect, operation 1040 may be performed by transceiver 404, processing system 410, memory 414, and/or zone location component 470, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for wireless communication performed at a transmitter user equipment (UE), comprising:
    determining a first zone identifier (ID) corresponding to a first zone in which the transmitter UE is located;
    determining a distance threshold based on a distance requirement of an application associated with the transmitter UE;
    determining a second zone ID based on the first zone ID, the distance threshold, a size of the first zone, or any combination thereof, wherein the second zone ID is the same for each of a subset of adjacent zones of a set of zones, wherein the first zone ID represents an individual zone within the subset of adjacent zones, and wherein a number of bits of the first zone ID is n bits, a number of bits of the second zone ID is m bits, and m is less than n; and
    transmitting the second zone ID and the distance threshold to one or more receiver UEs.

2. The method of claim 1, wherein the set of zones comprises a zone area or a plurality of zones.

3. The method of claim 1, wherein:
    n/2 bits represent an x-axis of the first zone,
    n/2 bits represent a y-axis of the first zone,
    m/2 bits represent an x-axis of the second zone ID, and
    m/2 bits represent a y-axis of the second zone ID.

4. The method of claim 1, wherein the second zone ID comprises a subset of bits of the first zone ID.

5. The method of claim 4, wherein the subset of bits of the first zone ID comprise one or more most significant bits of the first zone ID.

6. The method of claim 1, further comprising:
    determining a location of the transmitter UE; and
    identifying the first zone based on the location of the transmitter UE.

7. The method of claim 1, wherein:
    a surface area of the earth is divided into a plurality of zone areas, the plurality of zone areas including a first zone area,
    the first zone area comprises a plurality of zones, the plurality of zones including the first zone,
    the plurality of zones is uniquely identified within the first zone area by a corresponding plurality of zone IDs, the plurality of zone IDs including the first zone ID, and
    a group of adjacent zones within the plurality of zones is associated with the second zone ID, the group of adjacent zones including the first zone.

8. The method of claim 1, wherein:
    a surface area of the earth is divided into a plurality of zones, the plurality of zones including the first zone,
    the plurality of zones is uniquely identified within the plurality of zones by a corresponding plurality of zone IDs, the plurality of zone IDs including the first zone ID, and
    a group of adjacent zones within the plurality of zones is associated with the second zone ID, the group of adjacent zones including the first zone.

9. The method of claim 1, wherein the distance threshold is a hybrid automatic repeat request (HARQ) feedback distance threshold.

10. The method of claim 1, wherein the transmitter UE transmits the second zone ID and the distance threshold to the one or more receiver UEs over a sidelink communication link.

11. The method of claim 10, wherein the transmitter UE transmits the second zone ID and the distance threshold to the one or more receiver UEs over the sidelink communication link in sidelink control information.

12. A transmitter user equipment (UE), comprising:
    a memory;
    at least one transceiver; and
    at least one processor communicatively coupled to the memory and the at least one transceiver, the at least one processor configured to:
        determine a first zone identifier (ID) corresponding to a first zone in which the transmitter UE is located;
        determine a distance threshold based on a distance requirement of an application associated with the transmitter UE;
        determine a second zone ID based on the first zone ID, the distance threshold, a size of the first zone, or any combination thereof, wherein the second zone ID is the same for each of a subset of adjacent zones of a set of zones, wherein the first zone ID represents an individual zone within the subset of adjacent zones, and wherein a number of bits of the first zone ID is n bits, a number of bits of the second zone ID is m bits, and m is less than n; and
    cause the at least one transceiver to transmit the second zone ID and the distance threshold to one or more receiver UEs.

13. The transmitter UE of claim 12, wherein:
    n/2 bits represent an x-axis of the first zone,
    n/2 bits represent a y-axis of the first zone,
    m/2 bits represent an x-axis of the second zone ID, and
    m/2 bits represent a y-axis of the second zone ID.

* * * * *